United States Patent
Terborn et al.

[11] Patent Number: 6,149,246
[45] Date of Patent: Nov. 21, 2000

[54] COMPRESSED-AIR ARRANGEMENT FOR TRUCKS

[75] Inventors: Bengt Erlano Terborn, Askim; Sören Nils Bystedt, Torslanda, both of Sweden

[73] Assignee: Volvo Lastvagnar AB, Gothenburg, Sweden

[21] Appl. No.: 09/242,986

[22] PCT Filed: Aug. 22, 1997

[86] PCT No.: PCT/SE97/01382

§ 371 Date: Feb. 26, 1999

§ 102(e) Date: Feb. 26, 1999

[87] PCT Pub. No.: WO98/09859

PCT Pub. Date: Mar. 12, 1998

[30] Foreign Application Priority Data

Sep. 2, 1996 [SE] Sweden ................................ 9603173

[51] Int. Cl.[7] .............................................. B60T 13/00
[52] U.S. Cl. ............................................ 303/7; 280/124.16
[58] Field of Search ............................. 303/7, 9.66, 85, 303/86, 80, 57, 58, 59, 60, 64, 65; 280/124.16, 124.161

[56] References Cited

U.S. PATENT DOCUMENTS

| 3,924,902 | 12/1975 | Engle | 303/3 |
|---|---|---|---|
| 5,445,440 | 8/1995 | Plantan | 303/7 |
| 5,845,723 | 12/1998 | Hirahara et al. | 280/124.16 |
| 6,007,078 | 12/1999 | Gottschalk et al. | 170/86.751 |

FOREIGN PATENT DOCUMENTS

| 0165376 | 12/1985 | European Pat. Off. . |
|---|---|---|
| 0463329 | 1/1992 | European Pat. Off. . |
| 0496958 | 8/1992 | European Pat. Off. . |
| 1208207 | 12/1965 | Germany . |

*Primary Examiner*—Michael Mar
*Assistant Examiner*—Robert A. Siconolfi
*Attorney, Agent, or Firm*—Samuels, Gauthier & Stevens, LLP

[57] ABSTRACT

A compressed-air supply system for goods vehicles, comprising an air-suspension system and a brake system, wherein the brake system is dimensioned to operate at a lower air pressure than the air-suspension system, and wherein the compressed-air supply system comprises at least one compressed-air tank (43, 51) for supplying the brake system with compressed air. The compressed-air tank (43, 44) is dimensioned for an air pressure which is greater than or equal to the air pressure which is demanded in the air-suspension system and, further, the compressed-air tank is connected to both the air-suspension system and the brake system and comprises compressed-air conduits (40, 40'; 52, 52') through which compressed air can pass by way of one or more outlets in the compressed-air tank (43, 51) to the brake system and the air-suspension system, respectively, wherein a pressure-limiting valve (44, 55) is arranged downstream of the outlet to the compressed-air conduit(s) connecting the compressed-air tank (43, 51) with the brake system.

7 Claims, 3 Drawing Sheets

COMPRESSED-AIR ARRANGEMENT FOR TRUCKS

TECHNICAL FIELD

The invention regards a compressed-air supply system for trucks comprising an air-suspension system and a brake system, wherein the brake system is dimensioned to operate at a lower air pressure than the air-suspension system, and wherein the compressed-air supply system comprises at least one compressed-air tank for supplying the brake system with compressed air.

BACKGROUND

When a truck is provided with air-suspension, it is necessary that the compressed-air supply system of the vehicle has sufficient capacity to allow quick and efficient loading and unloading cycles. Large amounts of compressed air are consumed, particularly when connecting and disconnecting swap bodies and so called trailers, or semi-trailers. However, at the same time the compressed-air system must primarily have sufficient capacity to meet the demand of compressed air for the vehicle's brake system.

Trucks having air-suspension are usually provided with special high pressure compressors and with high pressure tanks for the air-suspension system containing up to 110 liters of air. The air-suspension system is supplied with compressed air at an air pressure of between 7 bar up to 12 bar. The brake system operates at a considerably lower air pressure, between 5 bar and 7.5 bar. For this reason, the vehicle must be provided with separate air supply systems and separate compressed-air tanks for the brakes and the air-suspension. Furthermore, the vehicle's brake system comprises special compressed-air tanks for the front and the rear brake circuit, respectively. Taken together, this implies that conventional trucks with air-suspension usually have about eight air tanks which must be built into the chassis of the vehicle. In order to achieve this, a very complicated and expensive design of the chassis is required, since, of course, the available space is limited.

Moreover, the many air tanks require that space, which otherwise could be used for transporting goods, must be reserved for storage of compressed air. In addition, the weight of the air tanks detracts from the weight of the goods which may be transported by the vehicle.

However, with the present invention a compressed-air system of the type mentioned in the introduction has been achieved, offering the possibility of reducing the number of compressed-air tanks.

The compressed-air system in accordance with the invention is primarily distinguished by the compressed-air tank being dimensioned for an air pressure which is greater than or equal to the air pressure which is demanded in the air-suspension system and further by the compressed-air tank being connected to both the air-suspension system and the brake system and comprising compressed-air conduits through which compressed air can pass by way of one or more outlets in the compressed-air tank to the brake system and the air-suspension system, respectively, wherein a pressure-limiting valve is arranged downstream of the outlet to the compressed-air conduit(s) connecting the compressed-air tank with the brake system.

By using a compressed-air system in accordance with the invention, it is possible to largely utilize the same air tanks for the air supply to the brake system as for the air-suspension. Hereby, the number of compressed-air tanks which is required to supply a vehicle with compressed air may be reduced by one or several tanks. By storing compressed air at a pressure of 12 bar in the brake air tanks, the air can be used in the upper pressure region for the air-suspension and in the lower pressure region for the brake system.

This is preferably achieved by the use of a seven-port protection valve having four compressed-air circuits. Further, pressure limiting valves are employed in order to obtain a lower pressure in the respective front and rear brake circuits of the vehicle.

For certain types of goods vehicles having a rear overhang, it is possible to omit the compressed-air tank which, when using a conventional compressed-air supply system, is placed in the overhang. Hereby, it is also possible to omit the cross-bar on which the compressed-air tank is mounted, whereby the overhang can be shortened. This results in a saving of both weight and space.

SHORT DESCRIPTION OF DRAWINGS

In the following, the invention will be described in more detail, with reference to the appended drawings.

DETAILED DESCRIPTION OF THE INVENTION

Figure 1:
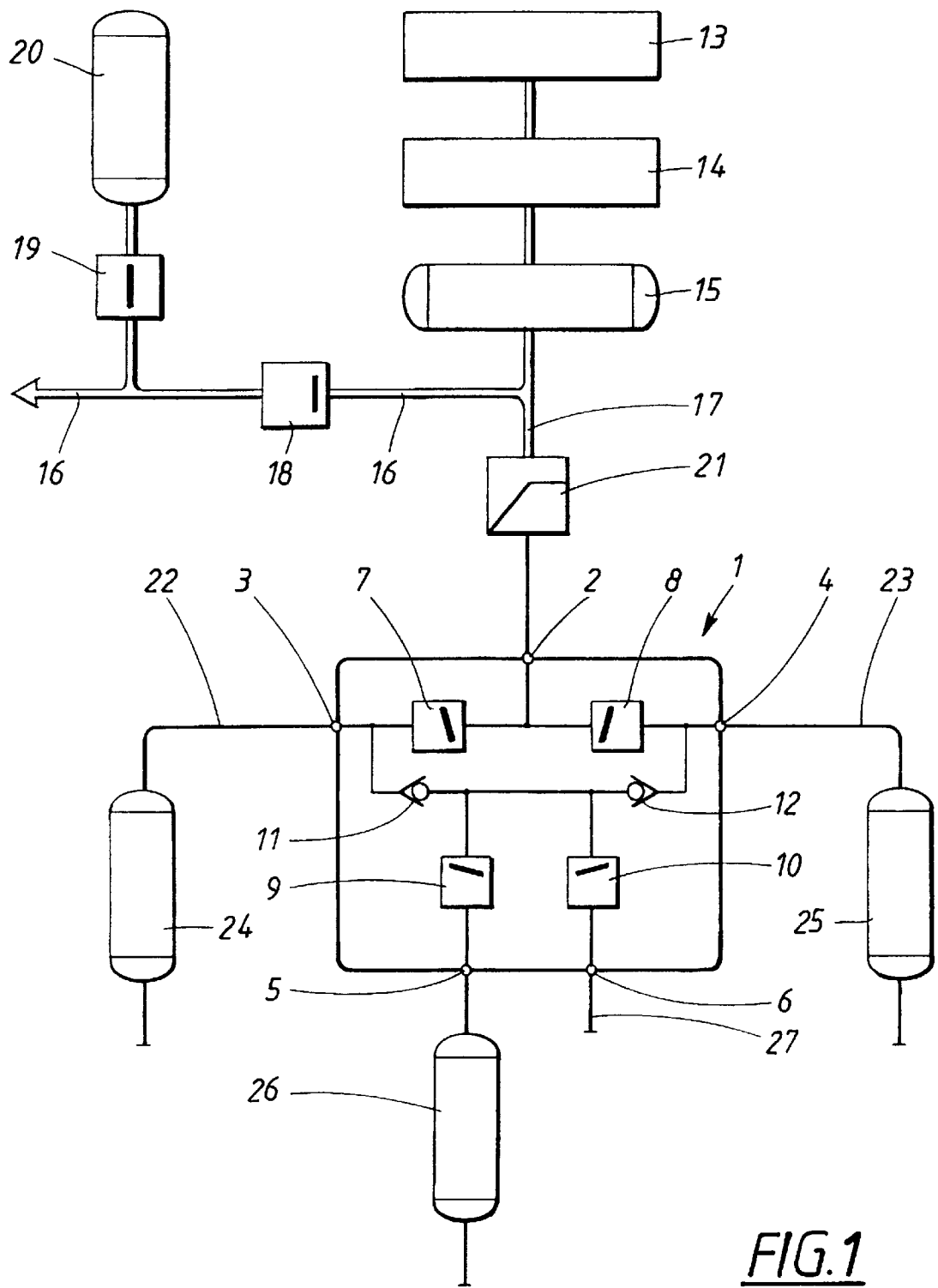
FIG. 1 shows a schematic view of a conventional compressed-air supply system.

The conventional compressed-air system which is shown in FIG. 1 comprises a four-circuit protection valve 1 having five ports 2–6. The protection valve 1 comprises four overflow valves 7–10 and two non-return valves 11,12.

A compressor 13 delivers air at a pressure of 12 bar. The air is passed through an air dryer 14 and into a distribution tank 15 which is a wet tank, dimensioned for a pressure of 12 bar. Two air conduits 16,17, an air-suspension air conduit 16 to the air-suspension system (not shown in the drawing), and a brake air conduit 17 to the brake system via the protection valve 1, run from the distribution tank 15. The air conduit 16 to the air-suspension system passes a first overflow valve 18 which only opens for air passage into the system if the air pressure exceeds 6.7–7.0 bar. If the air pressure after the first overflow valve 18 exceeds 10.0–10.4 bar, a second overflow valve 19 is opened into an air-suspension tank 20, which thereby is filled with air. Otherwise, the compressed air is conducted out through the air-suspension air conduit 16 to the air-suspension system.

The air to the brake system is conducted in the brake air conduit 17 through a pressure-limiting valve 21. The air flow is thereafter further conducted through the first port 2 in the five-port protection valve 1 and is divided up into two conduits 22,23 one for the rear brake circuit and one for the front brake circuit. Back-flow through the two conduits 22,23 is limited by two further overflow valves 7,8 which are arranged on each air conduit 22,23 as components of the protection valve 1. After the overflow valves 7,8, each air flow is divided again so that one portion is conducted out to a rear and a front brake tank 24,25, respectively, and one part of each air flow is conducted through a non-return valve 11,12 to a parking air tank 26 and to an outlet for additional equipment 27. Backflow from the parking air tank 26 and the outlet for additional equipment 27 is limited by a fourth and a fifth pressure-limiting valve 9,19 which allow back-flow of air at a pressure exceeding 5.5–5.8 bar.

The compressed-air tanks which are shown in FIG. 1 as supplying the air-suspension system and the front and rear brake circuits with compressed air have, for the sake of simplicity, each been shown as a single tank. In reality, both the air-suspension tank 20 and the brake tanks 24,25 usually consist of two or more compressed-air tanks each.

As is realised by studying the previously known air supply system shown in FIG. 1, this system is designed to primarily supply the brake system with compressed air and secondly the air-suspension system. Since the air pressure in the brake circuits is considerably lower than the pressure in the air-suspension system, separate compressed-air tanks are needed for the two systems.

Figure 2:
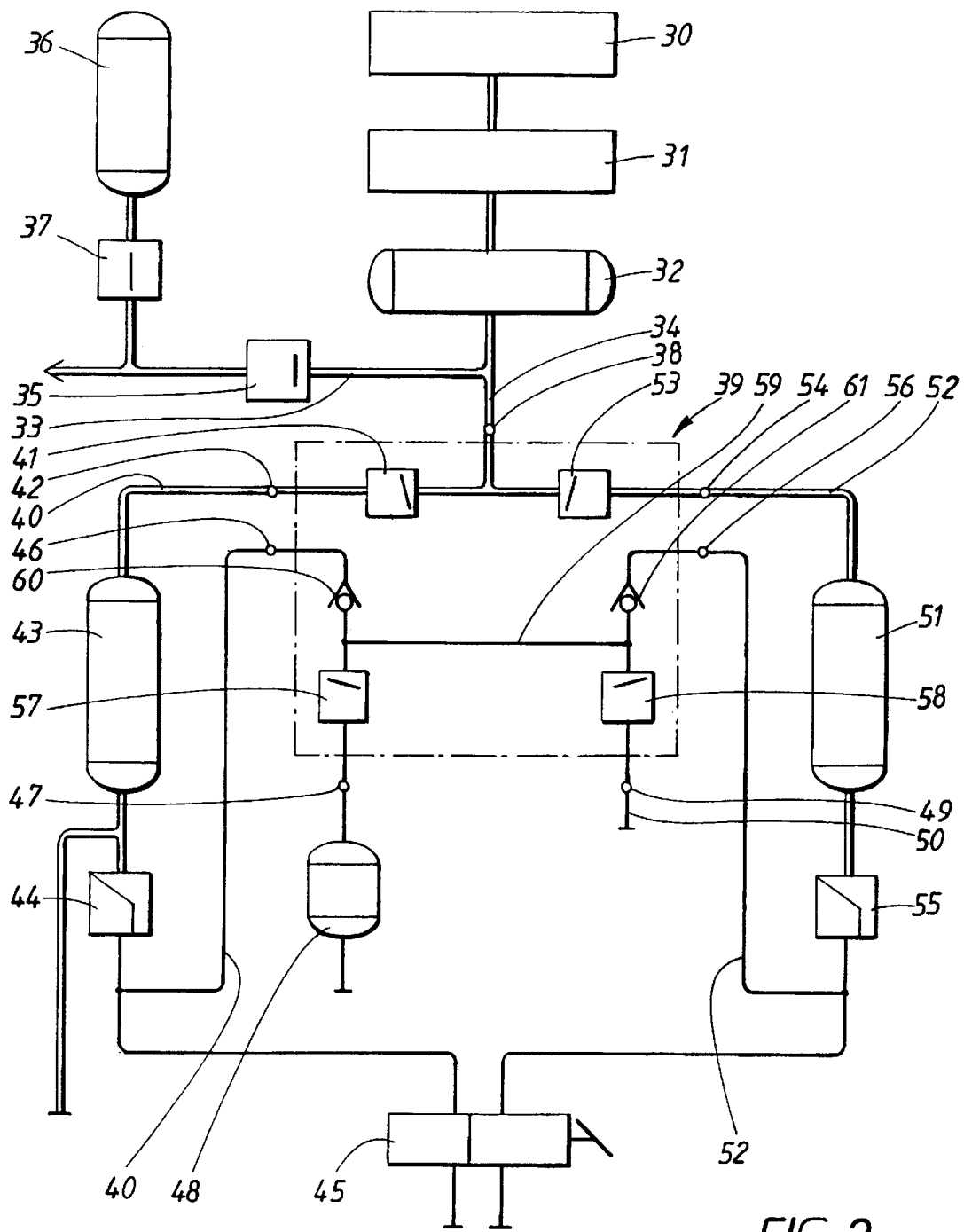
FIG. 2 shows a schematic view of a compressed-air supply system in accordance with the invention.

An air supply system in accordance with the invention, as shown in FIG. 2, comprises a compressor 30 which delivers air at an air pressure of 12.5–13.0 bar through an air dryer 31 to a distribution tank 32. After the distribution tank 32 the compressed air is divided into two air conduits 33,34 whereby an air-suspension air conduit 33 leads to the vehicle's air-suspension system and a brake air conduit 34 leads to the vehicle's brake system. The compressed air passes into the air-suspension system through an overflow valve 35 which is opened at 6.7–7.0 bar and which does not allow back-flow. The compressed air is thereafter collected in an air-suspension tank 36 after passage through an overflow valve 37 which is opened at 10.0–10.4 bar and which allows full back-flow. The air-suspension tank 36 supplies the air-suspension system with compressed air via the air-suspension air conduit 33.

The compressed air is conducted through the brake air conduit 34 from the distribution tank 32 to the brake system in through a first port 38 on the high pressure side of a seven-port four-circuit protection valve 39. In the protection valve 39, the compressed-air flow is further divided into two parts which supply the rear brake circuit and the front brake circuit of the vehicle, respectively.

In the rear brake circuit, the compressed air is passed through a rear brake conduit 40 through a first pressure-limiting valve 41 which is part of the protection valve 39 and which allows back-flow at a pressure exceeding approximately 5.0 bar. The compressed air is thereafter passed out through a second port 42 on the high pressure side of the protection valve 39 to a rear brake circuit air tank 43. By arranging a pressure-limiting valve 44 downstream of the outlet in the air tank 43 of the rear brake circuit, the compressed air obtains a lower air pressure which is adapted to the brake system.

The air tank 43 of the rear brake circuit is connected to a foot-brake valve 45. Further, the air is conducted in a brake circuit conduit 40' from the air tank 43 to the low pressure side of the protection valve 39 through a fourth port 46 in the protection valve 39 and out through a sixth port 47 to a parking air tank 48. Furthermore, via the fourth port 46, the air tank 43 of the rear brake circuit is connected to an outlet for additional equipment in communication with a seventh port 49 in the protection valve 39.

In a corresponding manner as for the rear brake circuit, the compressed-air tank 51 of the front brake circuit is supplied with compressed air through a front brake air conduit 52 and via a second overflow valve 53 which allows back-flow at a pressure exceeding approximately 5.0 bar. The air is passed from the high pressure side of the protection valve 39 to the air tank 51 through a third port 54 in the protection valve 39. In order to obtain a suitable air pressure for the brake system, as in the rear brake system, the air is conducted from the air tank 51 of the front brake circuit through a pressure-limiting valve 55. After the pressure-limiting valve 55, the air tank 51 of the front brake circuit is connected to the parking brake air tank 48 and the outlet for additional equipment 50 via a brake air conduit 52' and a fifth port 56 in the protection valve 39. In addition, the air tank 51 of the front brake circuit is also connected to the foot-brake valve 45.

The air supply to the parking air tank and the additional equipment through the sixth port 47 and the seventh port 49 in the protection valve 39 is controlled by an overflow valve 57,58 which is connected to each of the ports 47,49. The overflow valves 57,58 are opened at a pressure of 5.5–5.8 bar and allow limited back-flow to a connecting conduit 59 between the two ports 47,49. In order to prevent the compressed air from flowing back out of the protection valve 39, a non-return valve 60,61 is arranged inside each of the fourth and the fifth ports 46,56 in the protection valve 39.

In the same way as for the compressed-air system shown in FIG. 1, the compressed-air tanks shown in FIG. 2 may each consist of two or more tanks. However, taken as a whole, the compressed-air system shown in FIG. 2, in accordance with the invention, requires fewer compressed-air tanks than the conventional compressed-air system shown in FIG. 1, since the same compressed-air tanks to a large extent may be utilized for storing air both for the air-suspension system and for the brake system. In a conventional compressed-air system, the air-suspension tank is often a tank which holds 50 liters and two tanks of 30 liters each. However, in some vehicles only a tank of 50 liters or a tank of 50 liters and a tank of 30 liters is used. The compressed-air tank of the rear brake circuit usually consists of one or two tanks holding 30 liters and the compressed-air tanks of the front brake circuit normally hold 30 liters. The invention makes it possible to utilize the compressed air in the brake circuits to completely or partially supply also the air-suspension system with compressed air. Since the compressed-air tanks of the brake circuits hold at least 60 liters of compressed air, these tanks can always take the place of the 50 liter tank which is used for the air-suspension in conventional systems. In vehicles having brake circuits which together contain 90 liters, the compressed-air tank volume for the air-suspension may be reduced by a further 30 liter tank. The number of tanks which may be eliminated depends on whether the vehicle has two or three axles, since a vehicle with three axles has more brake air tanks than a vehicle with two axles.

By eliminating one or more compressed-air tanks, the weight of the vehicle is reduced by at least 50–60 kg which implies that the loading space and the loading weight are increased. The weight reduction is partly due to the fact that fewer air tanks are used but also to the reduced demand for other components such as consoles, pipes and nipples.

Figure 3:
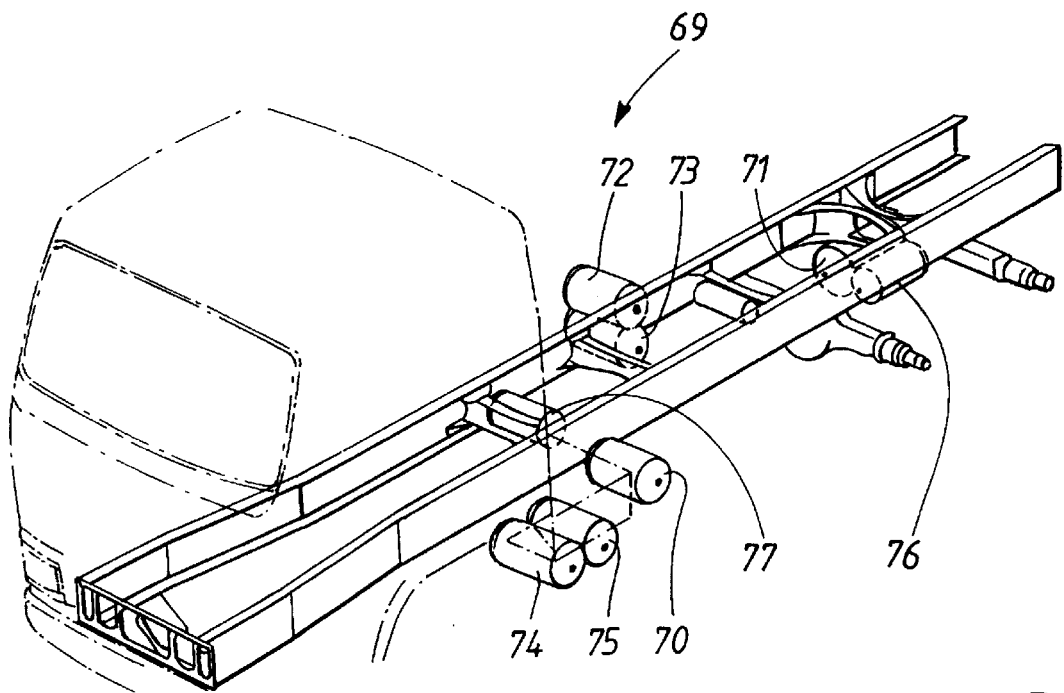
FIG. 3 shows a truck with compressed-air tanks.

FIG. 3 shows how compressed-air tanks comprised in a conventional compressed-air system are placed on the chassis 69 of a goods vehicle. Thereby, the chassis 69 exhibits a distribution tank 70 and three compressed-air tanks 71,72,73 which are part of the air-suspension system. In addition, a compressed-air tank 74 supplies the front brake circuit with compressed air and two compressed-air tanks 75,76 supply the rear brake circuit. Moreover, a parking air tank 77 is applied to the chassis 69.

The number of compressed-air tanks may be reduced, in accordance with the invention, by eliminating the compressed-air tanks 71,72,73 to the extent that a corresponding volume is available in the compressed-air tanks 74,75,76 belonging to the brake circuits. Accordingly, the rear compressed-air tank 71 for the air-suspension system as well as one of the brake air tanks 74,75,76 arranged centrally on the chassis 69 may be eliminated in accordance with the invention, since the compressed air in the brake air tanks 74,75,76 has a sufficiently high pressure to be used also in the air-suspension system.

Figure 4:
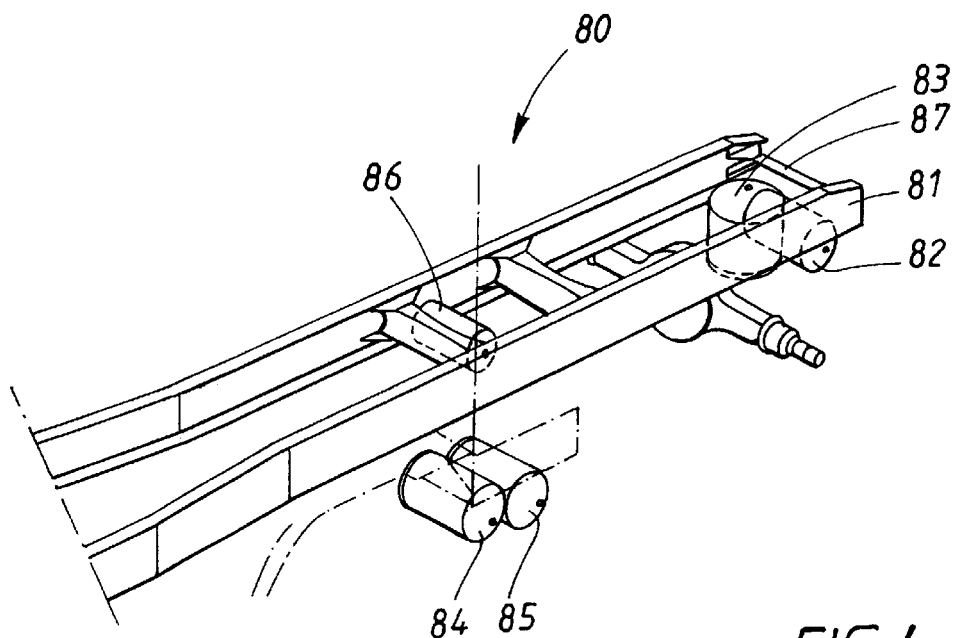
FIG. 4 shows a different type of truck with compressed-air tanks.

FIG. 4 shows a part of a chassis 80 of a conventional goods vehicle wherein the vehicle chassis 80 has a rear overhang 81, onto which is mounted an air tank 82 belonging to the brake system and an air tank 83 for the air-suspension system. Furthermore, the chassis 80 exhibits an additional brake air tank 84, a distribution tank 85, and a parking air tank 86. In a vehicle which is provided with a compressed-air system in accordance with the invention, the air tank 83 belonging to the air-suspension system may be eliminated. This is an advantage for several reasons. In this manner, it is possible to shorten the overhang 81 and to remove the transverse beam 87 on which the air tank 83 is mounted. Consequently, the weight of the vehicle is reduced and the loading capacity is increased both by the elimination of the air tank 83 and by making the overhang 81 smaller.

The invention shall not be regarded as being limited by the herein described embodiments. Accordingly, a number of further variants and modifications are conceivable within the scope of the appended claims.

What is claimed is:

1. A compressed-air system for goods vehicles, comprising an air-suspension system and a brake system, wherein the brake system is dimensioned to operate at a lower air pressure than the air-suspension system, and wherein the compressed-air supply system comprises at least one compressed-air tank for supplying the brake system with compressed air wherein the compressed-air tank is dimensioned for an air pressure which is greater than or equal to the air pressure which is demanded in the air-suspension system and further that the compressed-air tank is connected to both the air-suspension system and the brake system and comprises compressed-air conduits through which compressed air can pass by way of one or more outlets in the compressed-air tank to the brake system and the air-suspension system, respectively, wherein a pressure-limiting valve is arranged downstream of the outlet to the compressed-air conduit(s) connecting the compressed-air tank with the brake system.

2. A compressed-air supply system in accordance with claim 1, wherein the brake system comprises a front and a rear brake circuit which are supplied with compressed air from at least one compressed-air tank, and that the compressed-air supply system comprises a four-circuit protection valve having seven ports, wherein the protection valve exhibits a high pressure side and a low pressure side and that conduits for compressed air are arranged through the high pressure side of the protection valve in to the compressed-air tank and that conduits are arranged from the compressed-air tank to both of the brake circuits via the low pressure side of the protection valve wherein each such conduit to the brake system exhibits a pressure-limiting valve which is arranged between the compressed-air tank and the protection valve (39).

3. A compressed-air supply system in accordance with claim 2, wherein both of the brake circuits are supplied with compressed air from separate compressed-air tanks.

4. A compressed-air supply system in accordance with claim 1, wherein the pressure difference between the air-suspension system and the brake system is at least 2.5 bar.

5. A compressed-air supply system in accordance with claim 4, wherein the pressure difference between the air-suspension system and the brake system is at least 1.5 bar.

6. A compressed-air supply system in accordance with claim 1, wherein the air-suspension system operates at an air pressure of between 7 and 12 bar, and that the brake system operates at an air pressure between 5 bar and 7.5 bar.

7. A compressed-air supply system in accordance with claim 5, wherein the air-suspension system operates at an air pressure of between 10 bar and 12 bar and that the brake system operates at an air pressure between 6 bar and 7 bar.

* * * * *